United States Patent
Zhang et al.

(10) Patent No.: US 11,234,212 B2
(45) Date of Patent: Jan. 25, 2022

(54) PREDICTING PAGING FAILURE INFORMATION

(71) Applicant: Lenovo (Beijing) Limited, Beijing (CN)

(72) Inventors: Zhuoyun Zhang, Beijing (CN); Chenxi Zhu, Fairfax, VA (US); Lianhai Wu, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 0 days.

(21) Appl. No.: 16/967,508

(22) PCT Filed: Feb. 9, 2018

(86) PCT No.: PCT/CN2018/076011
§ 371 (c)(1),
(2) Date: Aug. 5, 2020

(87) PCT Pub. No.: WO2019/153251
PCT Pub. Date: Aug. 15, 2019

(65) Prior Publication Data
US 2021/0227494 A1    Jul. 22, 2021

(51) Int. Cl.
*H04W 68/02* (2009.01)

(52) U.S. Cl.
CPC .................. *H04W 68/02* (2013.01)

(58) Field of Classification Search
CPC .................................... H04W 68/02
USPC ........................................... 455/458
See application file for complete search history.

(56) References Cited

U.S. PATENT DOCUMENTS

| 2012/0087341 A1 | 4/2012 | Jang et al. |
| 2015/0146689 A1 | 5/2015 | Fu et al. |
| 2018/0110029 A1* | 4/2018 | Kim .............. H04W 68/02 |

OTHER PUBLICATIONS

CATT, "Discussion on RAN paging failure", R3-173612, 3GPP TSG-RAN WG3#97bis, Oct. 9-13, 2017, pp. 1-3.
NEC, "RAN paging failure handling in RRC_Inactive", R3-173814, 3GPP TSG-RAN WG3#97bis, Oct. 9-13, 2017, pp. 1-3.
PCT/CN2018/076011, "International Search Report and the Written Opinion of the International Search Authority" ISA/CN, State Intellectual Property Office of the P.R. China, Oct. 19, 2018, pp. 1-7.

* cited by examiner

*Primary Examiner* — Joel Ajayi
(74) *Attorney, Agent, or Firm* — Kunzler Bean & Adamson

(57) ABSTRACT

Apparatuses, methods, and systems are disclosed for predicting paging failure information. One method (700) includes predicting (702) paging failure information. The method (700) includes, in response to predicting the paging failure information, transmitting (704) a paging failure alert message to a first network unit (104). The paging failure alert message is used to determine inactive assistance information that is transmitted to a second network unit (104).

10 Claims, 9 Drawing Sheets

PREDICTING PAGING FAILURE INFORMATION

FIELD

The subject matter disclosed herein relates generally to wireless communications and more particularly relates to predicting paging failure information.

BACKGROUND

The following abbreviations are herewith defined, at least some of which are referred to within the following description: Third Generation Partnership Project ("3GPP"), Authentication Authorization and Accounting ("AAA"), Positive-Acknowledgment ("ACK"), Acknowledged Mode ("AM"), Access and Mobility Management Function ("AMF"), Access Server ("AS"), Authentication Server Function ("AUSF"), Cell Radio Network Temporary Identifier ("C-RNTI"), Database ("DB"), Dedicated Control Channel ("DCCH"), Downlink ("DL"), Domain Name System ("DNS"), Enhanced Mobile Broadband ("eMBB"), Evolved Node B ("eNB"), Enhanced Subscriber Identification Module ("eSIM"), Equipment Identity Register ("EIR"), Evolved Packet Core ("EPC"), European Telecommunications Standards Institute ("ETSI"), E-UTRAN Radio Access Bearer ("E-RAB"), Evolved-Universal Terrestrial Radio Access Network ("E-UTRAN"), Frequency Division Duplex ("FDD"), Frequency Division Multiple Access ("FDMA"), Fully Qualified Domain Name ("FQDN"), Global System For Mobile Communications Association ("GSMA"), Hybrid Automatic Repeat Request ("HARQ"), Home Policy Control Function ("H-PCF"), Home Public Land Mobile Network ("HPLMN"), Identity or Identifier or Identification ("ID"), International Mobile Equipment Identity ("IMEI"), International Mobile Subscriber Identity ("IMSI"), Internet-of-Things ("IoT"), Long Term Evolution ("LTE"), Multiple Access ("MA"), Modulation Coding Scheme ("MCS"), Mobile Country Code ("MCC"), Mobile Network Code ("MNC"), Machine Type Communication ("MTC"), Master Information Block ("MIB), Mobility Management ("MM"), Mobility Management Entity ("MME"), Non-Access Stratum ("NAS"), Narrowband ("NB"), Negative-Acknowledgment ("NACK") or ("NAK"), Next Generation Node B ("gNB"), Network Data Analytics ("NWDA"), Orthogonal Frequency Division Multiplexing ("OFDM"), Over-the-Air ("OTA"), Policy Control Function ("PCF"), Packet Data Convergence Protocol ("PDCP"), Public Land Mobile Network ("PLMN"), Pointer ("PTR"), Quality of Service ("QoS"), Random Access Channel ("RACH"), Radio Link Control ("RLC"), Radio Link Failure ("RLF"), Radio Network Layer ("RNL"), Radio Resource Control ("RRC"), Radio Resource Management ("RRM"), Radio Access Network ("RAN"), Reference Signal Received Power ("RSRP"), Reference Signal Received Quality ("RSRQ"), Receive ("RX"), Service Data Unit ("SDU"), Sequence Number ("SN"), Single Carrier Frequency Division Multiple Access ("SC-FDMA"), Subscriber Management Function ("SMF"), Subscriber Identity Module ("SIM"), System Information Block ("SIB"), Subscription Concealed Identifier ("SUCI"), Subscription Permanent Identifier ("SUPI"), Timing Advance Group ("TAG"), Tracking Area ("TA"), Transport Block ("TB"), Transport Network Layer ("TNL"), Transmit ("TX"), Unified Data Management ("UDM"), User Data Repository ("UDR"), User Entity/Equipment (Mobile Terminal) ("UE"), Universal Integrated Circuit Card ("UICC"), Uplink ("UL"), Universal Mobile Telecommunications System ("UMTS"), User Plane Function ("UPF"), Universal Subscriber Identity Module ("USIM"), Visited Policy Control Function ("V-PCF"), Visited Public Land Mobile Network ("VPLMN"), and Worldwide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, paging failures may occur. In such networks, the paging failures may adversely impact services.

BRIEF SUMMARY

Methods for predicting paging failure information and applying the predicted paging failure information in the network are disclosed. Apparatuses and systems also perform the functions of the apparatus. In one embodiment, the method includes predicting paging failure information. In various embodiments, the method includes, in response to predicting the paging failure information, transmitting a paging failure alert message to a first network unit. In such embodiments, the paging failure alert message is used to determine inactive assistance information that is transmitted to a second network unit.

In one embodiment, the paging failure alert message includes a remote unit identifier corresponding to a remote unit related to the paging failure information. In a further embodiment, the paging failure alert message includes a predicted paging failure area, a predicted paging failure time, or a combination thereof. In certain embodiments, the first network unit transmits the paging failure alert message to a third network unit in response to the remote unit accessing the third network unit which is serving the predicted paging failure area. In various embodiments, the third network unit transmits the inactive assistance information including the paging failure alert message to the second network unit at a time before the predicted paging failure time, or at a time proximate to the predicted paging failure time. In some embodiments, the second network unit determines whether to transition the remote unit to a radio resource control inactive state based on the paging failure alert message.

In certain embodiments, the second network unit serves the predicted paging failure area. In some embodiments, the method includes transmitting, to the first network unit, time expiration information corresponding to the prediction information. In various embodiments, the first network unit includes a unified data management device, the second network unit includes a base station, and the third network unit includes an access and mobility management function. In certain embodiments, the third network unit transmits the inactive assistance information to the second network unit in response to the second network unit serving the predicted paging failure area. In some embodiments, the paging failure information corresponds to radio access network paging. In various embodiments, the method includes transmitting a prediction cancelation message that includes information corresponding to canceling the previous prediction information.

An apparatus for predicting paging failure information, in one embodiment, includes a processor that predicts paging failure information. In various embodiments, the apparatus includes a transmitter that, in response to predicting the paging failure information, transmits a paging failure alert message to a first network unit. In such embodiments, the paging failure alert message is used to determine inactive assistance information that is transmitted to a second network unit.

In one embodiment, a method for determining whether to transition a remote unit to an inactive state includes receiving, at a second network unit, inactive assistance information. In such an embodiment, the inactive assistance information is determined based on a paging failure alert message received by a first network unit. In various embodiments, the method includes, in response to receiving the inactive assistance information, determining whether to transition a remote unit to an inactive state based on the inactive assistance information.

In one embodiment, the paging failure alert message includes a remote unit identifier corresponding to a remote unit related to the inactive assistance information. In a further embodiment, the paging failure alert message includes a predicted paging failure area, a predicted paging failure time, or a combination thereof. In certain embodiments, the first network unit transmits the paging failure alert message to a third network unit in response to the remote unit accessing the third network unit which is serving the predicted paging failure area.

In some embodiments, the method includes receiving the inactive assistance information including the paging failure alert message from the third network unit at a time before the predicted paging failure time, or at a time proximate to the predicted paging failure time. In various embodiments, the method includes determining whether to transition the remote unit to the inactive state based on the paging failure alert message. In certain embodiments, the second network unit serves the predicted paging failure area.

In some embodiments, the method includes receiving time expiration information corresponding to the prediction information. In various embodiments, the first network unit includes a unified data management device, the second network unit includes a base station, and the third network unit includes an access and mobility management function. In certain embodiments, receiving the inactive assistance information from the third network unit includes receiving, at the second network unit, the inactive assistance information from the third network unit in response to the second network unit serving the predicted paging failure area. In some embodiments, the paging failure information corresponds to radio access network paging. In various embodiments, the method includes receiving a prediction cancelation message that includes information corresponding to canceling the previous prediction message.

An apparatus for determining whether to transition a remote unit to an inactive state, in one embodiment, includes a receiver that receives, at a second network unit, inactive assistance information. In such an embodiment, the inactive assistance information is determined based on a paging failure alert message received by a first network unit. In various embodiments, the apparatus includes a processor that, in response to receiving the inactive assistance information, determines whether to transition a remote unit to an inactive state based on the inactive assistance information.

A method for predicting information, in one embodiment, includes predicting information. In various embodiments, the method includes, in response to predicting the information, transmitting a prediction message to a first network unit. In some embodiments, the method includes transmitting a prediction cancelation message that includes information corresponding to canceling the prediction message.

An apparatus for predicting information, in one embodiment, includes a processor that predicts information. In various embodiments, the apparatus includes a transmitter that transmits a prediction message to a first network unit in response to the processor predicting the information. In some embodiments, the transmitter transmits a prediction cancelation message that includes information corresponding to canceling the prediction message.

A method for receiving prediction information, in one embodiment, includes receiving a prediction message including prediction information. In some embodiments, the method includes receiving a prediction cancelation message that includes information corresponding to canceling the prediction message.

An apparatus for receiving prediction information, in one embodiment, includes a receiver that receives a prediction message including prediction information. In some embodiments, the receiver receives a prediction cancelation message that includes information corresponding to canceling the prediction message.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
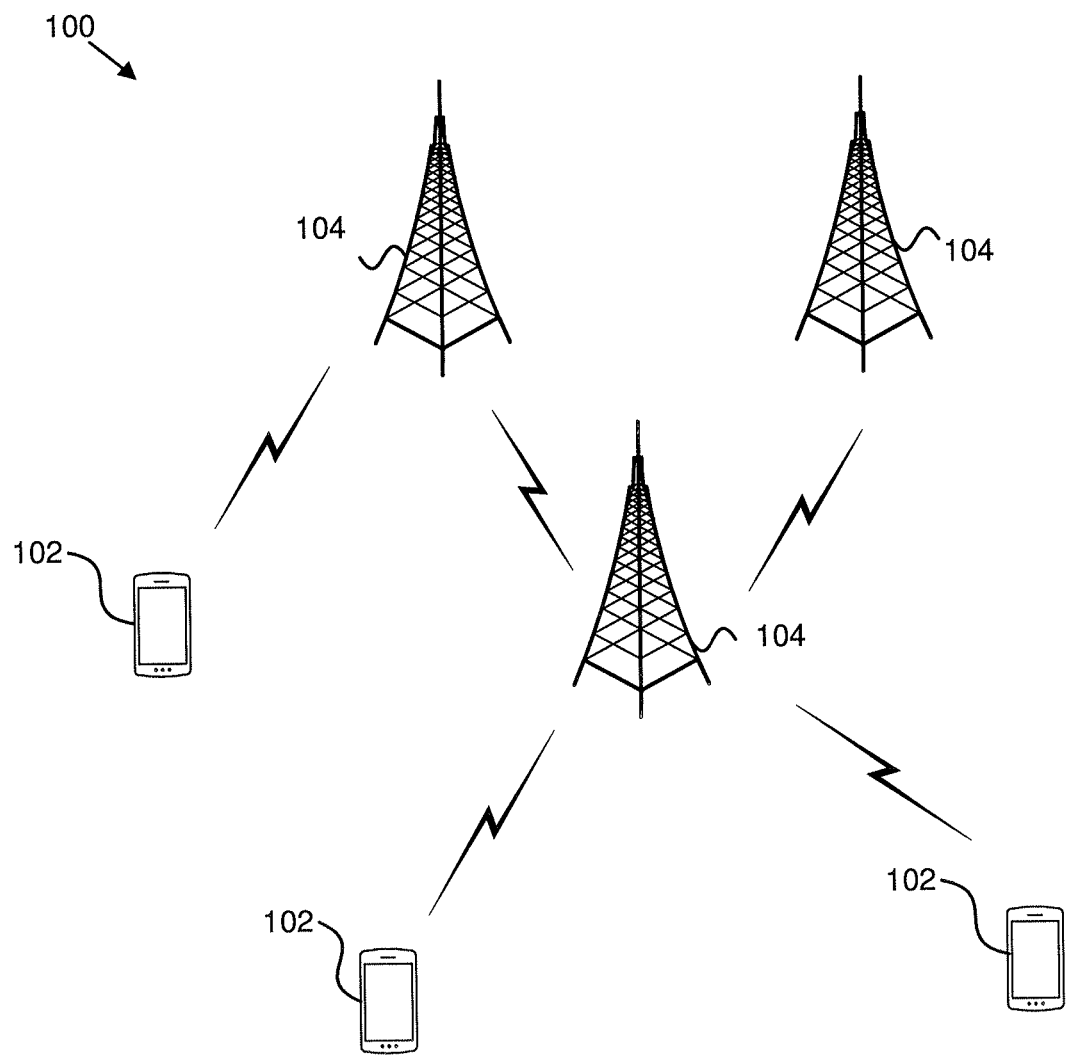
FIG. 1 is a schematic block diagram illustrating one embodiment of a wireless communication system for predicting paging failure information and/or determining whether to transition a remote unit to an inactive state.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for predicting paging failure information and/or determining whether to transition a remote unit to an inactive state. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), IoT devices, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals.

The network units 104 may be distributed over a geographic region. In certain embodiments, a network unit 104 may also be referred to as an access point, an access terminal, a base, a base unit, a base station, a Node-B, an eNB, a gNB, a Home Node-B, a relay node, a device, a network device, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art. In some embodiments, a network unit 104 may include one or more of the following network components an eNB, a gNB, an AMF, a RAN, a DB, an MME, a PCF, a UDR, a UPF, an NWDA, a serving gateway, and/or a UDM.

In one implementation, the wireless communication system 100 is compliant with the LTE of the 3GPP protocol, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In certain embodiments, a network unit 104 is used to predict paging failure information. In various embodiments, the network unit 104, in response to predicting the paging failure information, may transmit a paging failure alert message to a first network unit 104. In such embodiments, the paging failure alert message may be used to determine inactive assistance information that is transmitted to a second network unit 104. Accordingly, a network unit 104 may be used for predicting paging failure information.

In various embodiments, a network unit 104 may receive, at a second network unit 104, inactive assistance information. In such an embodiment, the inactive assistance information may be determined based on a paging failure alert message received by a first network unit 104. In various embodiments, the network unit 104 may include, in response to receiving the inactive assistance information, determining whether to transition a remote unit to an inactive state based on the inactive assistance information. Accordingly, a network unit 104 may be used for determining whether to transition a remote unit to an inactive state.

In some embodiments, a network unit 104 may predict information. In various embodiments, the network unit 104 may, in response to predicting the information, transmit a prediction message to a first network unit. In some embodiments, the network unit 104 may transmit a prediction cancelation message that includes information corresponding to canceling the previously provided prediction message. Accordingly, a network unit 104 may be used for predicting information.

In various embodiments, a network unit 104 receive a prediction message including prediction information. In certain embodiments, the network unit 104 may receive a prediction cancelation message that includes information corresponding to canceling the prediction message. In receiving the prediction cancelation message, the network unit 104 may transmit the prediction cancelation message to another network unit 104 which has already received the correlated prediction information. Furthermore, the network unit 104 may delete the correlated prediction information which is related with the prediction cancelation message. Accordingly, a network unit 104 may be used for receiving prediction information.

Figure 2:
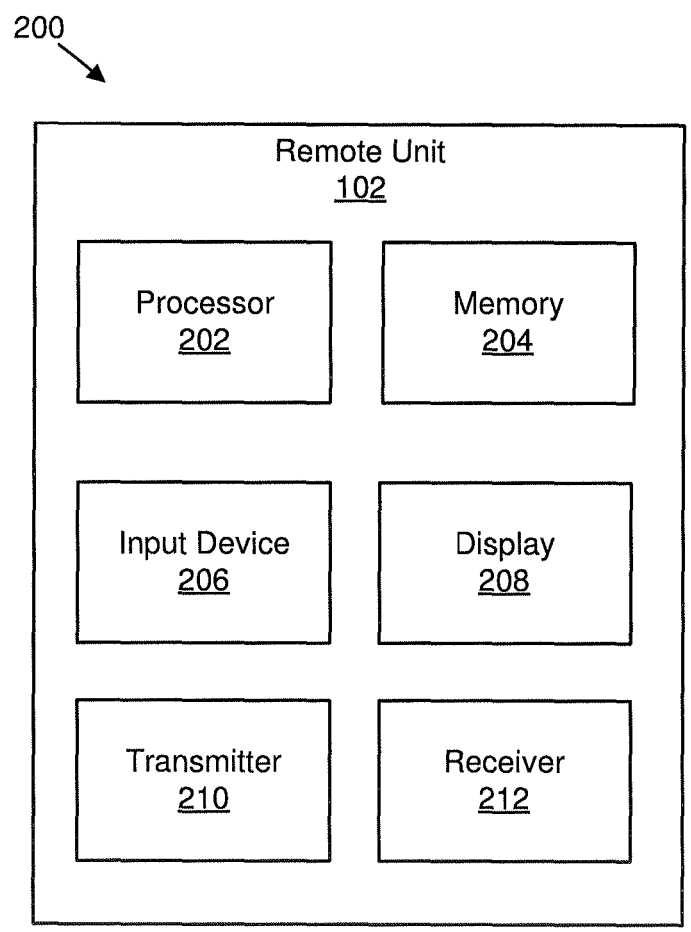
FIG. 2 is a schematic block diagram illustrating one embodiment of an apparatus that may be used for transmitting information.

FIG. 2 depicts one embodiment of an apparatus 200 that may be used for transmitting information. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to triggering a handover condition. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
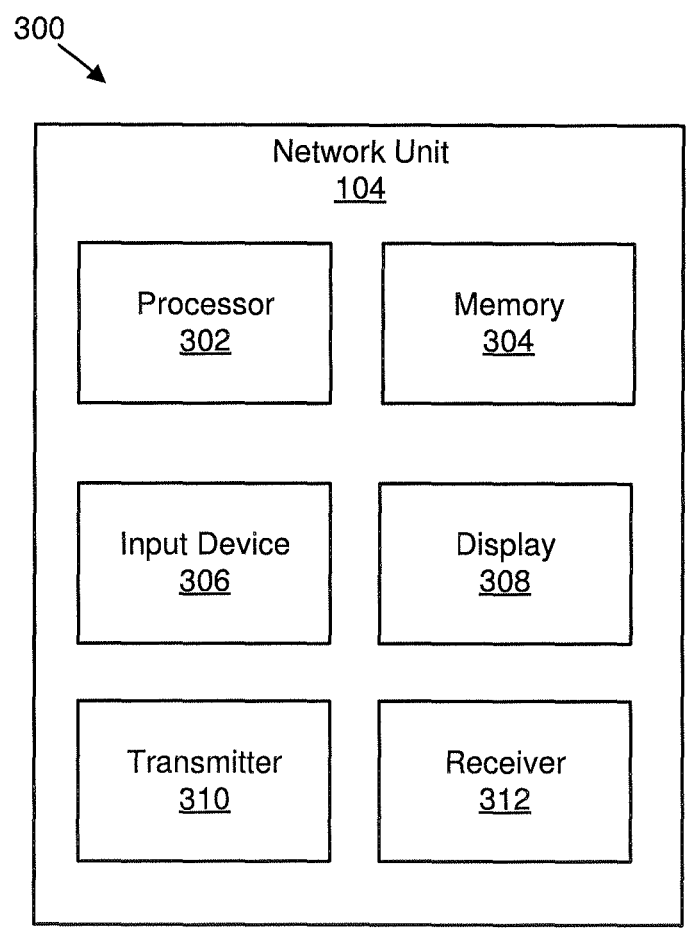
FIG. 3 is a schematic block diagram illustrating one embodiment of an apparatus that may be used for predicting paging failure information and/or determining whether to transition a remote unit to an inactive state.

FIG. 3 depicts one embodiment of an apparatus 300 that may be used for predicting paging failure information and/or transmitting information. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the processor 302 predicts paging failure information. In various embodiments, the transmitter 310, in response to predicting the paging failure information, transmits a paging failure alert message to a first network unit 104. In such embodiments, the paging failure alert message is used to determine inactive assistance information that is transmitted to a second network unit 104.

In one embodiment, the receiver 312 receives, at a second network unit 104, inactive assistance information. In such an embodiment, the inactive assistance information is determined based on a paging failure alert message received by a first network unit 104. In various embodiments, the transmitter 310, in response to receiving the inactive assistance information, transmits information based on the inactive assistance information.

In some embodiments, the processor 302 predicts information. In various embodiments, the transmitter 310 transmits a prediction message to a first network unit 104 in response to the processor predicting the information. In some embodiments, the transmitter 310 transmits a prediction cancelation message that includes information corresponding to canceling the prediction message.

In certain embodiments, the receiver 312 receives a prediction message including prediction information. In some embodiments, the receiver 312 receives a prediction cancelation message that includes information corresponding to canceling the prediction message.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
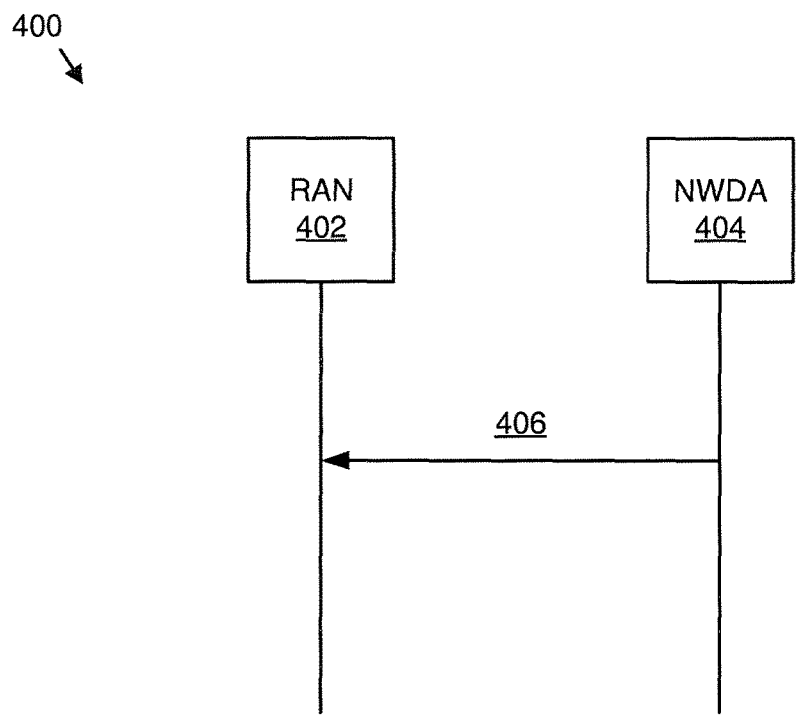
FIG. 4 illustrates one embodiment of communications for transmitting a paging failure subscription.

FIG. 4 illustrates one embodiment of communications 400 for transmitting a paging failure subscription. Specifically, communications 400 between a RAN 402 and a NWDA 404 are illustrated. As may be appreciated, any of the communications 400 described herein may be considered messages and/or parts of messages.

In one embodiment, the NWDA 404 may form a subscription with the RAN 402 (e.g., a gNB) so that the NWDA 404 may receive a RAN paging failure event notification. In some embodiments, if a RAN paging failure occurs, the RAN 402 (e.g., a gNB) may notify the NWDA 404 of the RAN paging failure event. As may be appreciated, the RAN 402 may notify the NWDA 404 immediately or at a later time. The time for notification may be based on a configuration and/or a local policy. In certain embodiments, the NWDA 404 may analyze and/or predict a RAN paging failure possibility at a certain time frame and/or location for one or more remote units 102 that have RAN paging failure events occur. For example, the NWDA 404 may determine that a first remote unit 102 has a higher statistical possibility for a RAN paging failure at a first gNB that is part of the RAN 402 on a weekday between 9:00 am-10:00 am. If a statistical possibility for a RAN paging failure exceeds certain threshold or limit, the NWDA 404 may notify the RAN 402 which may notify the first gNB. The first gNB may consider this information when it determines whether to transition the first remote unit 102 to an RRC inactive state. Thus, RAN paging failures for a remote unit 102 in an RRC inactive state may be reduced, thereby reducing data loss due to RAN paging failure and saving the network resources.

In some embodiments, in a first communication 406, the NWDA 404 may transmit information to the RAN 402. In such embodiments, the first communication 406 may include a RAN paging failure notification request. In some embodiments, if the NWDA 404 supports analysis of a RAN paging failure possibility, the NWDA 404 may send a RAN paging failure notification request to every gNB in the RAN 402 that supports an RRC inactive state.

Figure 5:
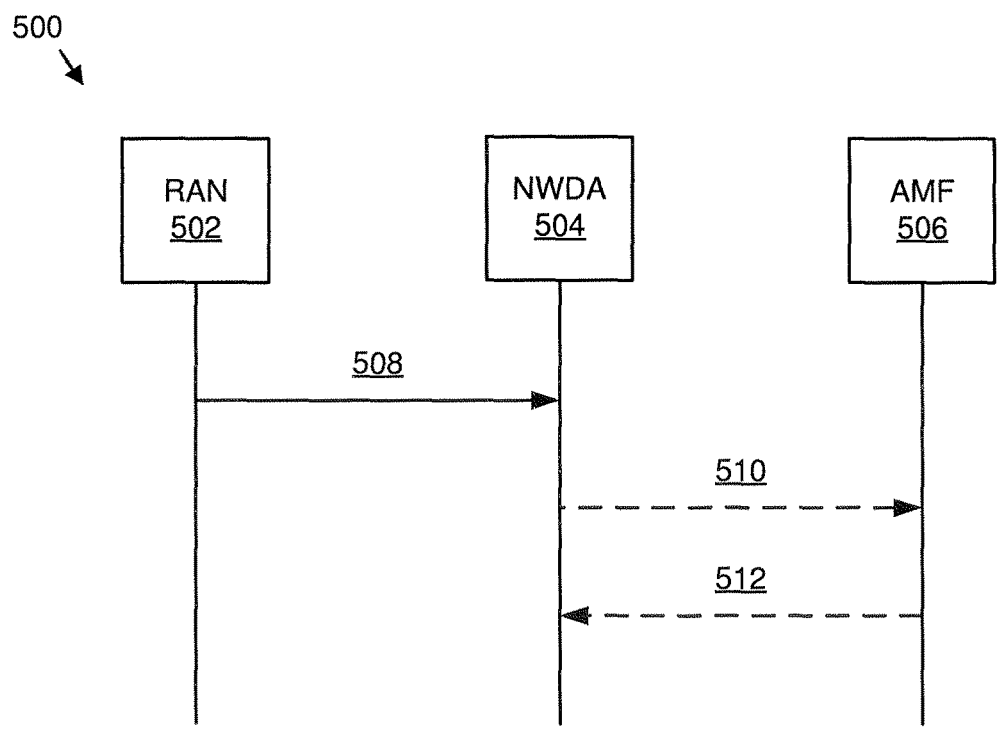
FIG. 5 illustrates one embodiment of communications for transmitting a paging failure report.

FIG. 5 illustrates one embodiment of communications 500 for transmitting a paging failure report. Specifically, communications 500 between a RAN 502, an NWDA 504, and an AMF 506 are illustrated. As may be appreciated, any of the communications 500 described herein may be considered messages and/or parts of messages.

In some embodiments, in a first communication 508, the RAN 502 may transmit information to the NWDA 504. Specifically, the RAN 502 (e.g., a gNB) may transmit a RAN paging failure report to the NWDA 504 in response to a RAN paging failure occurring for a remote unit 102. In certain embodiments, the RAN paging failure report may include a remote unit ID, a network unit ID (e.g., gNB ID), and/or a RAN paging area.

In various embodiments, in a second communication 510 (e.g., optional communication), the NWDA 504 may transmit information to the AMF 506. Specifically, the NWDA 504 may transmit an identity request to the AMF 506 to obtain a remote unit permanent ID (e.g., IMSI, SUPI, etc.) in response to a remote unit ID being a temporary ID.

In certain embodiments, in a third communication 512 (e.g., optional communication), the AMF 506 may transmit information to the NWDA 504. Specifically, the AMF 506 may transmit an identity response to the NWDA 504 that includes the remote unit permanent ID. In some embodiments, the NWDA 504 may record the remote unit permanent ID, the network unit ID, a failure time, and/or the RAN paging area corresponding to the remote unit 102 that has the RAN paging failure occurring.

Figure 6:
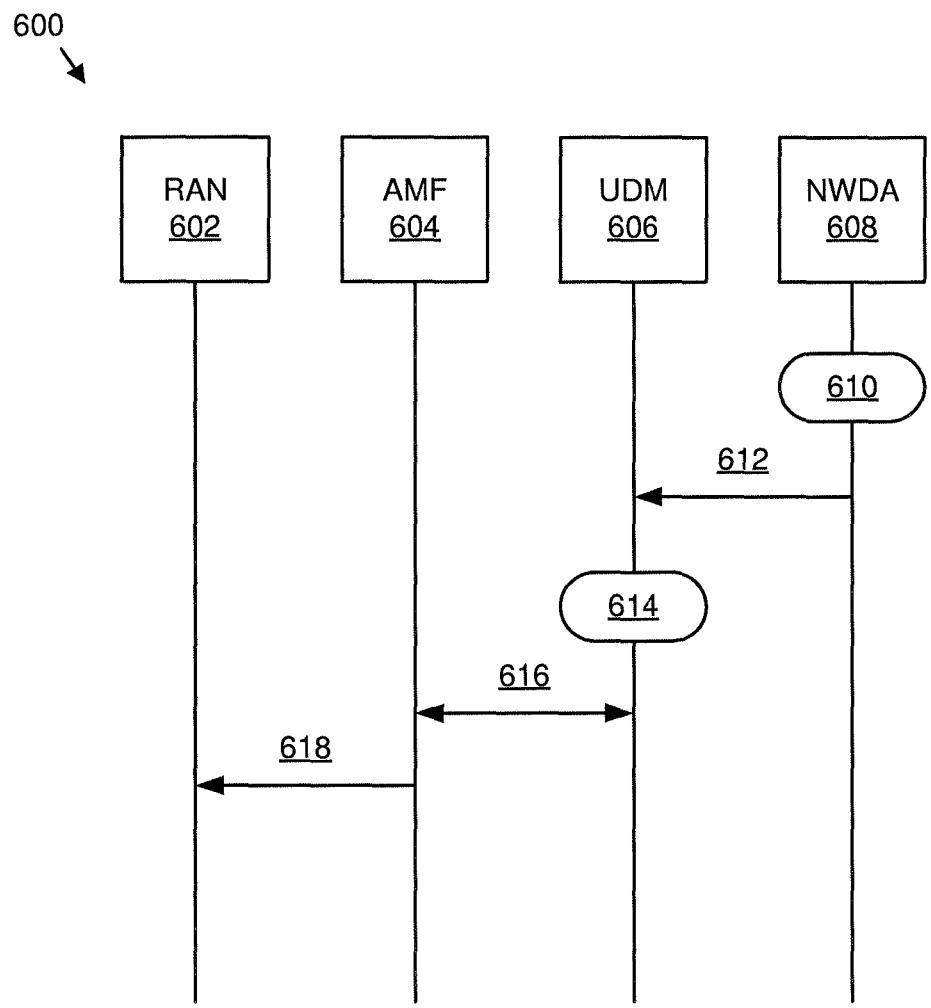
FIG. 6 illustrates one embodiment of communications for transmitting a paging failure alert message.

FIG. 6 illustrates one embodiment of communications 600 for transmitting a paging failure alert message. Specifically, communications 600 between a RAN 602, an AMF 604, a UDM 606, and a NWDA 608 are illustrated. As may be appreciated, any of the communications 600 described herein may be considered messages and/or parts of messages.

In various embodiments, the NWDA 608 may analyze 610 a possibility of a RAN paging failure occurring for a particular remote unit 102. In certain embodiments, in response to the NWDA 608 determining that a possibility of a RAN paging failure occurring for the particular remote unit 102 at a particular area and/or time exceeds a predetermined threshold (e.g., set by an operator and/or a local policy), the NWDA 608 may transmit a first communication 612 to the UDM 606.

In some embodiments, in the first communication 612, the NWDA 608 may transmit information to the UDM 606. Specifically, the NWDA 608 may transmit RAN paging failure prediction information (e.g., paging failure alert message) to the UDM 606. The UDM 606 may store the RAN paging failure prediction information in the subscription information corresponding to the particular remote unit 102. In various embodiments, the RAN paging failure prediction information may include a remote unit permanent ID, a RAN paging failure alert indication, a possible failure area, and/or a possible failure time.

In various embodiments, the UDM 606 may store 614 the RAN paging failure prediction information received from the NWDA 608 with the particular remote unit's 102 subscription information.

In certain embodiments, in a second communication 616, the UDM 606 may transmit information to and/or with the AMF 604. Specifically, in some embodiments, in response to the AMF 604 that serves a possible failure area initiating an update location procedure, the UDM 606 may send the RAN paging failure prediction information to the AMF 604 as access and mobility subscription information. In such embodiments, the RAN paging failure prediction information transmitted from the UDM 606 to the AMF 604 may include a RAN paging failure alert indication, a possible failure area, and/or a possible failure time.

In various embodiments, in a third communication 618, the AMF 604 may transmit information to the RAN 602.

Specifically, the AMF 604 may transmit a RAN paging failure alert indication as part of RRC inactive assistance information to the RAN 602. In some embodiments, the AMF 604 may only send a RAN paging failure alert indication at a time that is near, within, proximate to, and/or very close in time to a possible failure time. Moreover, the AMF 604 may send the RAN paging failure alert indication to a gNB within the RAN 602 that serves an indicated possible failure area. In certain embodiments, the AMF 604 may update RRC inactive assistance information with a RAN paging failure alert and may transmit the RRC inactive assistance information to a gNB within the RAN 602 that may serve the indicated possible failure area at the time that is near, within, proximate to, and/or very close in time to a possible failure time.

In some embodiments, in the third communication 618, the AMF 604 may transmit RAN paging failure prediction information as part of RRC inactive assistance information to the RAN 602 (e.g., gNB) that is serving the particular remote unit 102. In such embodiments, the RAN paging failure prediction information may include a possible failure area and/or a possible failure time. Moreover, in such embodiments, the RAN 602 may determine whether to send the remote unit 102 into an RRC inactive state and/or the RAN notification area based on the RAN paging failure prediction information.

In certain embodiments, in the third communication 618, the AMF 604 may not transmit RRC inactive assistance information to the RAN 602 (e.g., gNB) that is serving a possible failure area at a time that is near, within, proximate to, and/or very close in time to a possible failure time. In various embodiments, if the RRC inactive assistance information has already been sent to the RAN 602, the AMF 604 may withdraw the RRC inactive assistance information from the RAN 602.

In various embodiments, in the third communication 618, the AMF 604 may send a RAN paging failure alert indication to the RAN 602. In such an embodiment, the AMF 604 may only send the RAN paging failure alert indication at a time that is near, within, proximate to, and/or very close in time to a possible failure time, and to a gNB in the RAN 602 that may serve a possible failure area.

In some embodiments, in the first communication 612, the NWDA 608 may transmit a prediction available time (e.g., time expiration information) to the UDM 606 with prediction information. The prediction available time may indicate how long the prediction information may be considered to be valid. In various embodiments, in response to the prediction available time expiring, the prediction information may be considered to be invalid and/or the prediction information may be deleted by a function storing the prediction information.

In certain embodiments, the NWDA 608 may transmit a prediction canceling indicator to one or more network units 104 to indicate that previously sent prediction information is no longer valid (e.g., invalid). In such embodiments, the prediction canceling indicator may correspond to the previously sent prediction information (e.g., using some mapping). In various embodiments, if the NWDA 608 does not provide a prediction available time when providing the prediction information, one or more network units 104 that receive the prediction information may consider the prediction information to be valid until a prediction canceling indicator is received from the NWDA 608. In various embodiments, a network unit 104 may delete stored prediction information in response to receiving a prediction canceling indicator.

Figure 7:
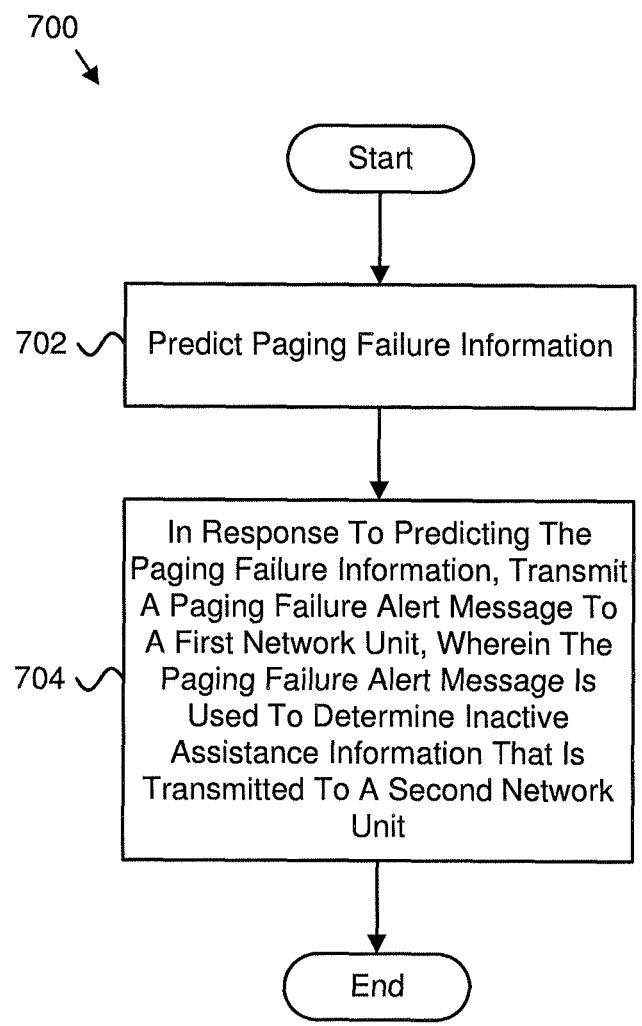
FIG. 7 is a schematic flow chart diagram illustrating one embodiment of a method for predicting paging failure information.

FIG. 7 is a schematic flow chart diagram illustrating one embodiment of a method 700 for predicting paging failure information. In some embodiments, the method 700 is performed by an apparatus, such as the network unit 104. In certain embodiments, the method 700 may be performed by a processor executing program code, for example, a microcontroller, a microprocessor, a CPU, a GPU, an auxiliary processing unit, a FPGA, or the like.

The method 700 may include predicting 702 paging failure information. In various embodiments, the method 700 includes, in response to predicting the paging failure information, transmitting 704 a paging failure alert message to a first network unit 104. In such embodiments, the paging failure alert message is used to determine inactive assistance information that is transmitted to a second network unit 104.

In one embodiment, the paging failure alert message includes a remote unit identifier corresponding to a remote unit 102 related to the paging failure information. In a further embodiment, the paging failure alert message includes a predicted paging failure area, a predicted paging failure time, or a combination thereof. In certain embodiments, the first network unit 104 transmits the paging failure alert message to a third network unit 104 in response to the remote unit 102 accessing the third network unit 104 which is serving the predicted paging failure area. In various embodiments, the third network unit 104 transmits the inactive assistance information including the paging failure alert message to the second network unit 104 at a time before the predicted paging failure time, or at a time proximate to the predicted paging failure time. In some embodiments, the second network unit 104 determines whether to transition the remote unit 102 to a radio resource control inactive state based on the paging failure alert message.

In certain embodiments, the second network unit 104 serves the predicted paging failure area. In some embodiments, the method 700 includes transmitting, to the first network unit 104, time expiration information corresponding to the paging failure prediction information. In various embodiments, the first network unit 104 includes a unified data management device, the second network unit 104 includes a base station, and the third network unit 104 includes an access and mobility management function. In certain embodiments, the third network unit 104 transmits the inactive assistance information to the second network unit 104 in response to the second network unit 104 serving the predicted paging failure area. In some embodiments, the paging failure information corresponds to radio access network paging. In various embodiments, the method 700 includes transmitting a prediction cancelation message that includes information corresponding to canceling the paging failure alert message.

Figure 8:
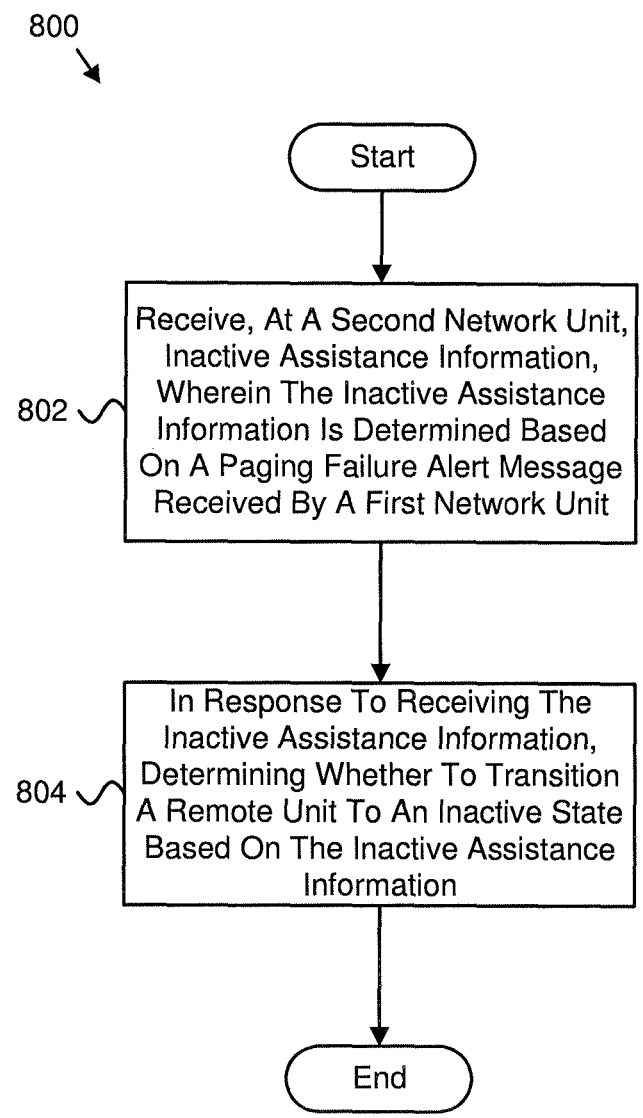
FIG. 8 is a schematic flow chart diagram illustrating one embodiment of a method for determining whether to transition a remote unit to an inactive state.

FIG. 8 is a schematic flow chart diagram illustrating one embodiment of a method 800 for determining whether to transition a remote unit to an inactive state. In some embodiments, the method 800 is performed by an apparatus, such as the network unit 104. In certain embodiments, the method 800 may be performed by a processor executing program code, for example, a microcontroller, a microprocessor, a CPU, a GPU, an auxiliary processing unit, a FPGA, or the like.

The method 800 may include receiving 802, at a second network unit 104, inactive assistance information. In such an embodiment, the inactive assistance information is determined based on a paging failure alert message received by a first network unit 104. In various embodiments, the method 800 includes, in response to receiving the inactive assistance information, determining 804 whether to transition a remote unit 102 to an inactive state based on the inactive assistance information.

In one embodiment, the paging failure alert message includes a remote unit identifier corresponding to a remote unit 102 related to the inactive assistance information. In a further embodiment, the paging failure alert message includes a predicted paging failure area, a predicted paging failure time, or a combination thereof. In certain embodiments, the first network unit 104 transmits the paging failure alert message to a third network unit 104 in response to the remote unit 102 accessing the third network unit 104 which is serving the predicted paging failure area.

In some embodiments, the method 800 includes receiving the inactive assistance information including the paging failure alert message from the third network unit 104 at a time before the predicted paging failure time, or at a time proximate to the predicted paging failure time. In various embodiments, the method 800 includes determining whether to transition the remote unit 102 to the inactive state based on the paging failure alert message. In certain embodiments, the second network unit 104 serves the predicted paging failure area.

In some embodiments, the method 800 includes receiving time expiration information corresponding to the paging failure information. In various embodiments, the first network unit 104 includes a unified data management device, the second network unit 104 includes a base station, and the third network unit 104 includes an access and mobility management function. In certain embodiments, receiving the inactive assistance information from the third network unit 104 includes receiving, at the second network unit 104, the inactive assistance information from the third network unit 104 in response to the second network unit 104 serving the predicted paging failure area. In some embodiments, the paging failure information corresponds to radio access network paging. In various embodiments, the method 800 includes receiving a prediction cancelation message that includes information corresponding to canceling the paging failure alert message.

Figure 9:
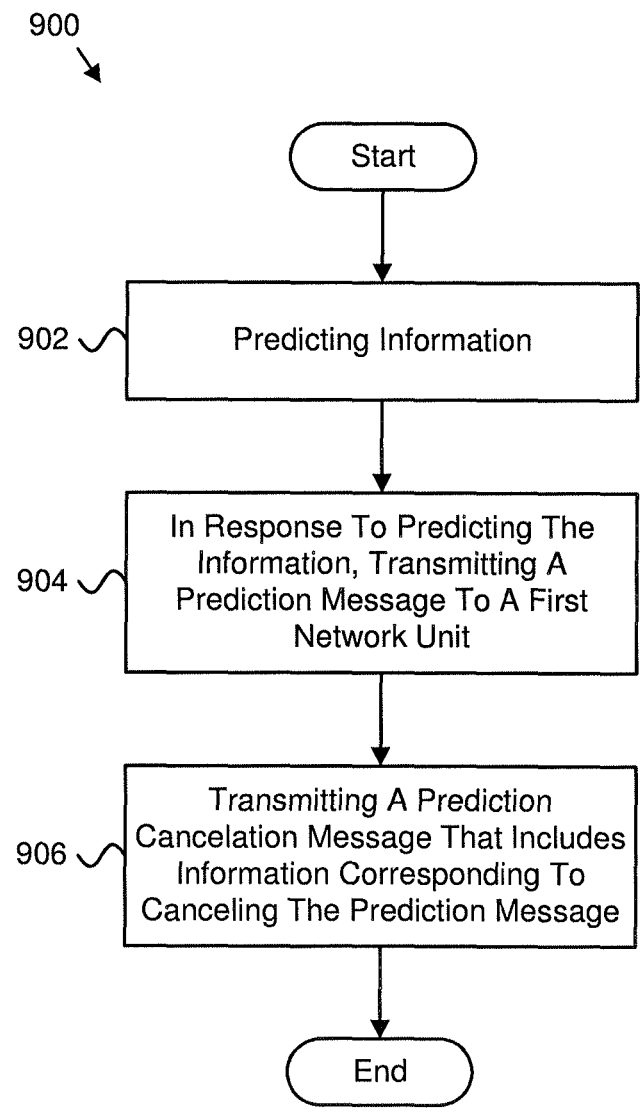
FIG. 9 is a schematic flow chart diagram illustrating one embodiment of a method for predicting information.

FIG. 9 is a schematic flow chart diagram illustrating one embodiment of a method 900 for predicting information. In some embodiments, the method 900 is performed by an apparatus, such as the network unit 104. In certain embodiments, the method 900 may be performed by a processor executing program code, for example, a microcontroller, a microprocessor, a CPU, a GPU, an auxiliary processing unit, a FPGA, or the like.

The method 900 may include predicting 902 information. In various embodiments, the method 900 includes, in response to predicting the information, transmitting 904 a prediction message to a first network unit 104. In some embodiments, the method 900 includes transmitting 906 a prediction cancelation message that includes information corresponding to canceling the prediction message.

Figure 10:
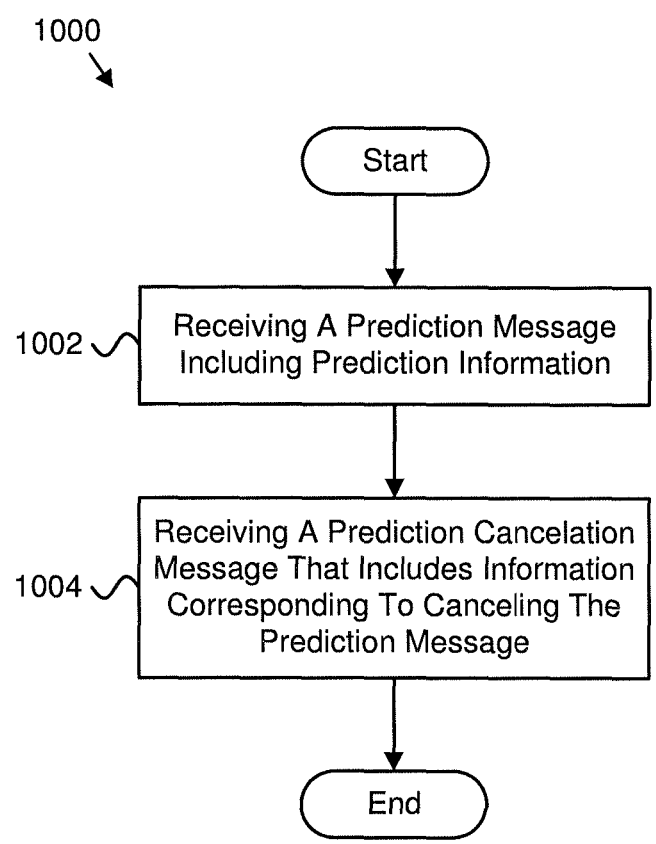
FIG. 10 is schematic flow chart diagram illustrating one embodiment of a method for receiving prediction information.

FIG. 10 is a schematic flow chart diagram illustrating one embodiment of a method 1000 for receiving prediction information. In some embodiments, the method 1000 is performed by an apparatus, such as the network unit 104. In certain embodiments, the method 1000 may be performed by a processor executing program code, for example, a microcontroller, a microprocessor, a CPU, a GPU, an auxiliary processing unit, a FPGA, or the like.

The method 1000 may include receiving 1002 a prediction message including prediction information. In some embodiments, the method 1000 includes receiving 1004 a prediction cancelation message that includes information corresponding to canceling the prediction message.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method at a network data analytics device, the method comprising:
   receiving, at the network data analytics device, a paging failure event notification from a base station;
   determining a predicted paging failure area for a remote device having a remote device identifier based on the paging failure event notification from the base station;
   determining a predicted paging failure time for the remote device based on the paging failure event notification from the base station;
   predicting a potential paging failure occurring for the remote device based on the predicted paging failure area and the predicted paging failure time, wherein predicting the potential paging failure comprises comparing the predicted paging failure area and the predicted paging failure time to corresponding predetermined thresholds; and
   in response to the predicted paging failure area and the predicted paging failure time exceeding the corresponding predetermined thresholds, transmitting a paging failure alert message from the network data analytics to a first network device comprising a unified data management, wherein the unified data management uses the paging failure alert message to determine inactive assistance information that is transmitted to a second network device comprising an access and mobility management function, and the paging failure alert message comprises the remote device identifier, the predicted paging failure area, and the predicted paging failure time.

2. The method of claim 1, wherein the remote device identifier corresponds to the remote device related to the predicted potential paging failure.

3. The method of claim 2, wherein the first network device transmits the paging failure alert message to a third network device in response to the remote device accessing the third network device which is serving the predicted paging failure area.

4. The method of claim 3, wherein the third network device transmits the inactive assistance information including the paging failure alert message to the second network device at a time before the predicted paging failure time, or at a time proximate to the predicted paging failure time.

5. The method of claim 4, wherein the second network device serves the predicted paging failure area.

6. The method of claim 4, wherein the third network device transmits the inactive assistance information to the second network device response to the second network device serving the predicted paging failure area.

7. An apparatus comprising a network data analytics device, the apparatus further comprising:
   a receiver that receives a paging failure event notification from a base station;
   a processor that:
      determines a predicted paging failure area for a remote device having a remote device identifier based on the paging failure event notification from the base station;

determines a predicted paging failure time for the remote device based on the paging failure event notification from the base station; and predicts a potential paging failure occurring for the remote device based on the predicted paging failure area and the predicted paging failure time, wherein predicting the potential paging failure comprises comparing the predicted paging failure area and the predicted paging failure time to corresponding predetermined thresholds; and a transmitter that, in response to the predicted paging failure area and the predicted paging failure time exceeding the corresponding predetermined thresholds, transmits a paging failure alert message from the network data analytics to a first network device comprising a unified data management, the unified data management uses the paging failure alert message to determine inactive assistance information that is transmitted to a second network device comprising an access and mobility management function, and the paging failure alert message comprises the remote device identifier, the predicted paging failure area, and the predicted paging failure time.

8. The apparatus of claim 7, wherein the remote device identifier corresponds to the remote device related to the predicted potential paging failure.

9. The apparatus of claim 8, wherein the first network device transmits the paging failure alert message to a third network device in response to the remote device accessing the third network device which is serving the predicted paging failure area.

10. The apparatus of claim 9, wherein the third network device transmits the inactive assistance information including the paging failure alert message to the second network device at a time before the predicted paging failure time, or at a time proximate to the predicted paging failure time.

* * * * *